United States Patent
Bowley

(10) Patent No.: US 12,263,493 B2
(45) Date of Patent: Apr. 1, 2025

(54) SAND SEPARATOR WITH CERAMIC INSERT

(71) Applicant: ENERCORP ENGINEERED SOLUTIONS INC., Calgary (CA)

(72) Inventor: Ryan Thomas Bowley, Calgary (CA)

(73) Assignee: ENERCORP ENGINEERED SOLUTIONS INC., Calgary (CA)

(*) Notice: Subject to any disclaimer, the term of this patent is extended or adjusted under 35 U.S.C. 154(b) by 859 days.

(21) Appl. No.: 17/479,442

(22) Filed: Sep. 20, 2021

(65) Prior Publication Data

US 2022/0097081 A1 Mar. 31, 2022

Related U.S. Application Data

(60) Provisional application No. 63/083,167, filed on Sep. 25, 2020.

(51) Int. Cl.
| | |
|---|---|
| *B04C 5/18* | (2006.01) |
| *B01D 45/12* | (2006.01) |
| *B04C 3/06* | (2006.01) |
| *B04C 5/04* | (2006.01) |
| *B04C 5/103* | (2006.01) |
| *B04C 5/185* | (2006.01) |

(52) U.S. Cl.
CPC .............. *B04C 5/103* (2013.01); *B01D 45/12* (2013.01); *B04C 3/06* (2013.01); *B04C 5/04* (2013.01); *B04C 5/18* (2013.01); *B04C 5/185* (2013.01)

(58) Field of Classification Search
None
See application file for complete search history.

(56) References Cited

U.S. PATENT DOCUMENTS

| | | | | |
|---|---|---|---|---|
| 4,539,105 A | * | 9/1985 | Metcalf | B04C 5/18 156/84 |
| 4,652,363 A | * | 3/1987 | Miller | B04C 5/02 210/512.1 |
| 4,790,666 A | * | 12/1988 | Koziol | B01F 25/102 210/512.1 |
| 2008/0290008 A1 | * | 11/2008 | Hakola | B01D 45/12 209/715 |
| 2013/0014710 A1 | * | 1/2013 | Munson, Jr. | B60L 1/02 122/367.1 |
| 2018/0200733 A1 | * | 7/2018 | Kingsbury | B04C 5/085 |

* cited by examiner

*Primary Examiner* — Chester T Barry
(74) *Attorney, Agent, or Firm* — MH2 Technology Law Group, LLP

(57) ABSTRACT

A sand separator and method of manufacturing a sand separator, of which the sand separator includes an insert defining a vortical flow chamber therein. The insert comprises a cylindrical portion and a conical portion, and the insert is made at least partially from a ceramic material. The separator also includes an inlet extending through the insert in the cylindrical portion and configured to introduce a sand-laden fluid into the vortical flow chamber, a first outlet extending through vertically upward from the cylindrical portion and configured to receive a fluid portion of the sand-laden fluid from the vortical flow chamber, and a second outlet extending vertically downward from the conical portion and configured to receive a sand portion of the sand-laden fluid from the vortical flow chamber.

20 Claims, 5 Drawing Sheets

SAND SEPARATOR WITH CERAMIC INSERT

CROSS-REFERENCE TO RELATED APPLICATIONS

This application claims priority to U.S. Provisional patent application having Ser. No. 63/083,167, which was filed on Sep. 25, 2020, and is incorporated herein by reference in its entirety.

BACKGROUND

Hydraulic fracturing is a well-treatment process in which preferential flowpaths for hydrocarbons are established in a subterranean rock formation by pumping a fluid at high pressures into a well to initiate fractures in the rock formation. The fluid is predominately water, but may also include solids, such as sand or ceramic proppants, which at least partially fill the fractures and maintain the preferential flowpaths.

When oil or other fluids are produced/recovered from the well, it may be desirable to remove sand or other solids from the produced fluid. Typically, a separator system is used, which may include one or more separation devices ("separators"), filters, screens, tanks, etc. The separator system is generally connected to a wellhead via pipes or tubing. The fluid thus flows from well, into the wellhead, and then to the separator system, where the solids are separated out. The solids may be stored in a tank and periodically removed, while the fluids may be further separated (e.g., to separate hydrocarbons from water). Recovered hydrocarbons may be stored or otherwise transported for sale, and recovered water may be stored or otherwise recirculated for use in the well.

The separators may be vortical flow or "cyclonic" separators and may define a vortical flow chamber therein. The particulate-laden fluids recovered from the well are introduced into this vortical flow chamber, generally through a tangential inlet. The vortical flow chamber typically has an opening in the top through which an outlet tube is received that extends into the vortical flow chamber. The lighter fluids exit up through this outlet tube. The separators also have an opening in the bottom, through which the heavier solids are received. The fluids received into the inlet may be at relatively high pressures and speed, and, since they include particulate matter such as sand, may be abrasive to the structure defining the vortical flow chamber and can lead to frequent maintenance requirements for the wellhead systems and relatively short lifecycles for the separators.

SUMMARY

Embodiments of the disclosure provide a sand separator including an insert defining a vortical flow chamber therein. The insert comprises a cylindrical portion and a conical portion, and the insert is made at least partially from a ceramic material. The separator also includes an inlet extending through the insert in the cylindrical portion and configured to introduce a sand-laden fluid into the vortical flow chamber, a first outlet extending through vertically upward from the cylindrical portion and configured to receive a fluid portion of the sand-laden fluid from the vortical flow chamber, and a second outlet extending vertically downward from the conical portion and configured to receive a sand portion of the sand-laden fluid from the vortical flow chamber.

Embodiments of the disclosure also provide a method for constructing a sand separator including positioning a first alignment ring in a first arm of a fixture, and positioning a second alignment ring in a second arm of the fixture. The fixture holds the first and second alignment rings in position relative to one another. The method also includes casting an insert from a ceramic material at least partially within the first and second alignment rings, and receiving the insert, the first alignment ring, and the second alignment ring in a housing having an inlet, a first outlet, and a second outlet. The inlet, the first outlet, and the second outlet each communicate with a vortical flow chamber defined within the insert.

Embodiments of the disclosure further provide a sand separator including an insert defining a vortical flow chamber therein. The insert includes a cylindrical portion and a conical portion and is made at least partially from a ceramic material. The sand separator also includes an inlet extending through the insert in the cylindrical portion and configured to introduce a mixed fluid into the vortical flow chamber, a first outlet extending through vertically upward from the cylindrical portion and configured to receive a first portion of the mixed fluid from the vortical flow chamber, the first portion having a reduced sand content as compared to the mixed fluid, a second outlet extending vertically downward from the conical portion and configured to receive a second portion of the mixed fluid from the vortical flow chamber, the second portion having an increased sand content as compared to the mixed fluid, a first alignment ring fixed to the insert and located proximal to a top of the insert, the inlet extending through the first alignment ring, and a second alignment ring fixed to the insert and located proximal to a bottom of the insert, the second outlet extending axially through the second alignment ring.

BRIEF DESCRIPTION OF THE DRAWINGS

The present disclosure may best be understood by referring to the following description and the accompanying drawings that are used to illustrate embodiments of the invention. In the drawings.

DETAILED DESCRIPTION

Figure 1:
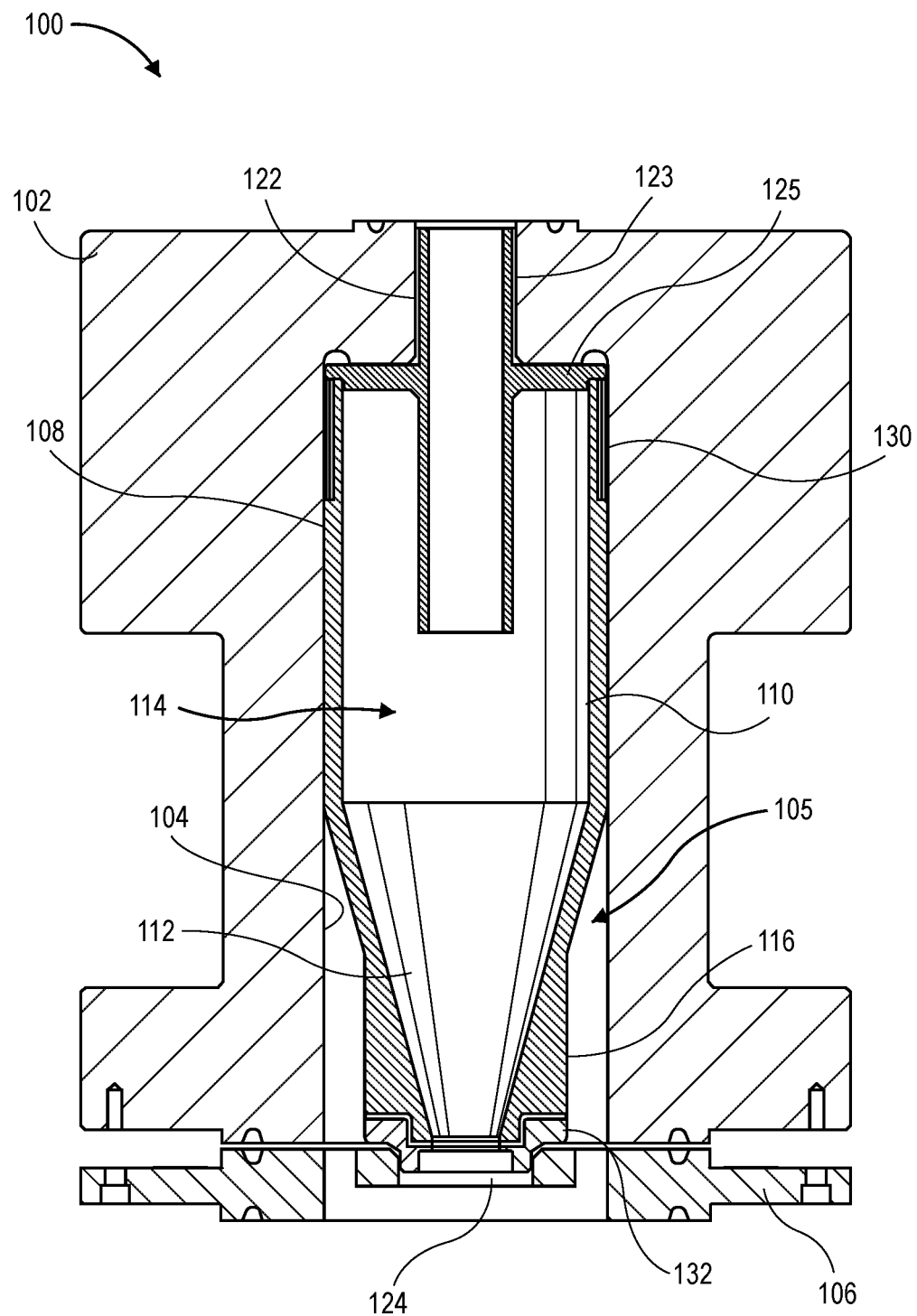
FIG. 1 illustrates a side, cross-sectional view of a sand separator including a ceramic insert forming at least a portion of a vortical flow chamber, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a side, cross-sectional view of a separator 100, according to an embodiment. The separator 100 includes a housing 102, which has an inner wall 104 defining a hollow region 105 within the housing 102. The housing 102 also includes a detachable bottom member 106, which may be removed to permit access to the hollow region 105.

An insert 108 may be installed within the hollow region 105 e.g., by being received through an open bottom of the housing 102 when the bottom member 106 is detached. The insert 108 may be at least partially made from a ceramic material. For example, the insert 108 may be at least partially made from a cast ceramic material, such as silicon carbide.

In an embodiment, the insert 108 may generally include a cylindrical portion 110 and a conical portion 112 that extends downwards from the cylindrical portion 110. Together, the cylindrical portion 110 and the conical portion 112 define a vortical flow chamber 114 within the interior of the insert 108. The insert 108 may further include a base 116 that extends radially outward from at least part of the conical portion 112, e.g., to support the insert 108 on the bottom member 106, as will be described in greater detail below.

A tangential inlet 120 (not visible in FIG. 1; see FIG. 2 and discussion below) may extend through the housing 102 and through the cylindrical portion 110, so as to communicate with the vortical flow chamber 114 within the insert 108. A first outlet 122 may extend upwards from within the cylindrical portion 110 and through the top of the housing 102. In some embodiments, the first outlet 122 may be formed from a tube 123 connected to a flange 125 that rests of the top of the insert 108. Further, the bottom end of the conical portion 112 may be open to communicate with a second outlet 124 in the housing 102. During operation, particulate-laden fluid is introduced into the vortical flow chamber 114 of the insert 108 via the inlet 120, separated solids drop out of fluid via the second outlet 124, and separated fluids flow upwards, through the first outlet 122.

A first alignment ring 130 and a second alignment ring 132 may be positioned around the insert 108. The first and second alignment rings 130, 132 may be made from a metal, such as stainless steel or another steel alloy, and may be formed to a precise geometry. For example, the first alignment ring 130 may be positioned around the cylindrical portion 110, e.g., extending downward from the top of the insert 108. The second alignment ring 132 may be positioned proximal to the bottom of the insert 108, e.g., covering the bottom of the insert 108. The first and second alignment rings 130, 132 may be secured to the ceramic material of the insert 108, such that the first and second alignment rings 130, 132 are not movable with respect to the insert 108. Further, the first alignment ring 130 may be configured to engage the inner wall 104 of housing 102, and the cylindrical portion 110 may be spaced radially inward from the inner wall 104, such that only the first alignment ring 130 contacts the inner wall 104. In other embodiments, the first alignment ring 130 may be recessed into the ceramic insert 108, and thus at least some of the cylindrical portion 110 thereof may contact the inner wall 104.

Similarly, the second alignment ring 132 may be configured to contact the bottom member 106, and thereby prevent the remainder of the insert 108 from contacting the housing 102 or the bottom member 106. In an embodiment, the second alignment ring 132 may form a cap over the bottom of the insert 108. Further, the second alignment ring 132 may extend at least partially into the second outlet 124 and bear against the bottom member 106. As such, the second alignment ring 132 may prevent the bottom end of the insert 108 from moving laterally with respect to the housing 102, and may provide a weight-transmitting interface therewith.

Figure 2:
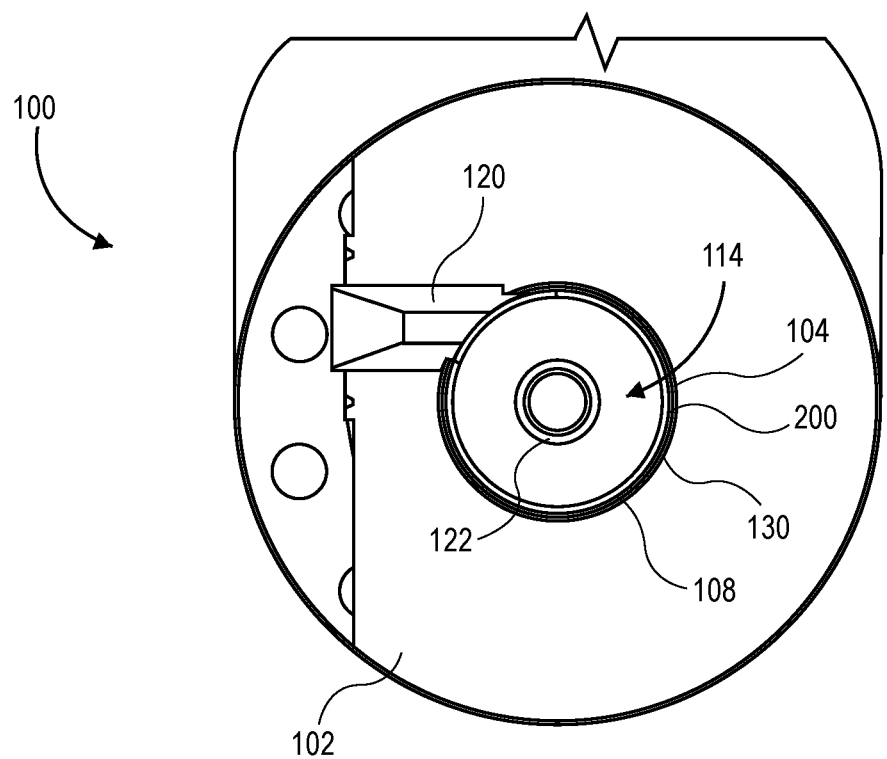
FIG. 2 illustrates a top, cross-sectional view of the sand separator, showing the top of the ceramic insert, according to an embodiment.
Figure 3:
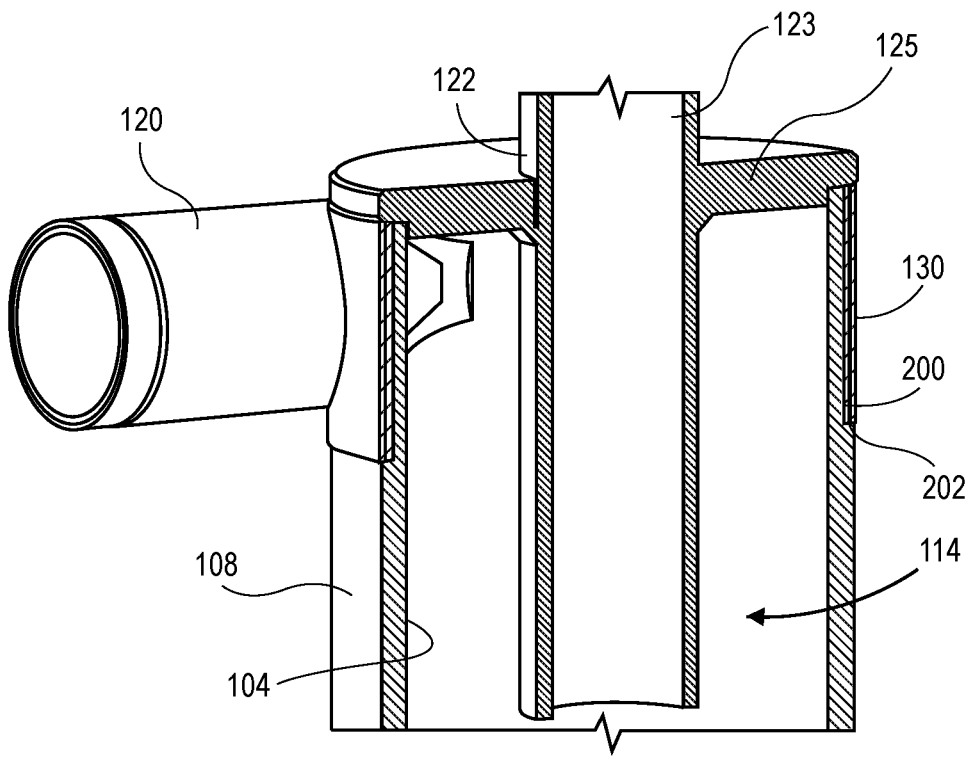
FIG. 3 illustrates a sectional view of an upper portion of the sand separator, according to an embodiment.

FIG. 2 illustrates a top, cross-sectional view of the separator 100, according to an embodiment. FIG. 3 illustrates a perspective view of a section of the insert 108, omitting the housing 102, and depicting an upper portion of the insert 108, according to an embodiment. As shown in FIG. 2, the inlet 120 extends at least partially through the housing 102, and communicates with the insert 108 therein. In particular, the inlet 120 may extend into alignment with the first alignment ring 130, which may include an opening for permitting the fluid to be received into the insert 108 from the inlet 120.

As can be seen in FIGS. 2 and 3, the first alignment ring 130 is secured to the insert 108 by a layer of adhesive 200 that is interposed radially between the first alignment ring 130 and the insert 108. Further, the insert 108 forms a shoulder 202 or is otherwise recessed to receive the first alignment ring 130 and/or the layer of adhesive 200 interposed between the first alignment ring 130 and the insert 108. As such, the first alignment ring 130 may provide both radial alignment, as it extends farther radially outward than the insert 108, as well as vertical alignment, as it bears against the shoulder 202 of the insert 108 and the flange 125 of the first outlet 122.

Figure 4:
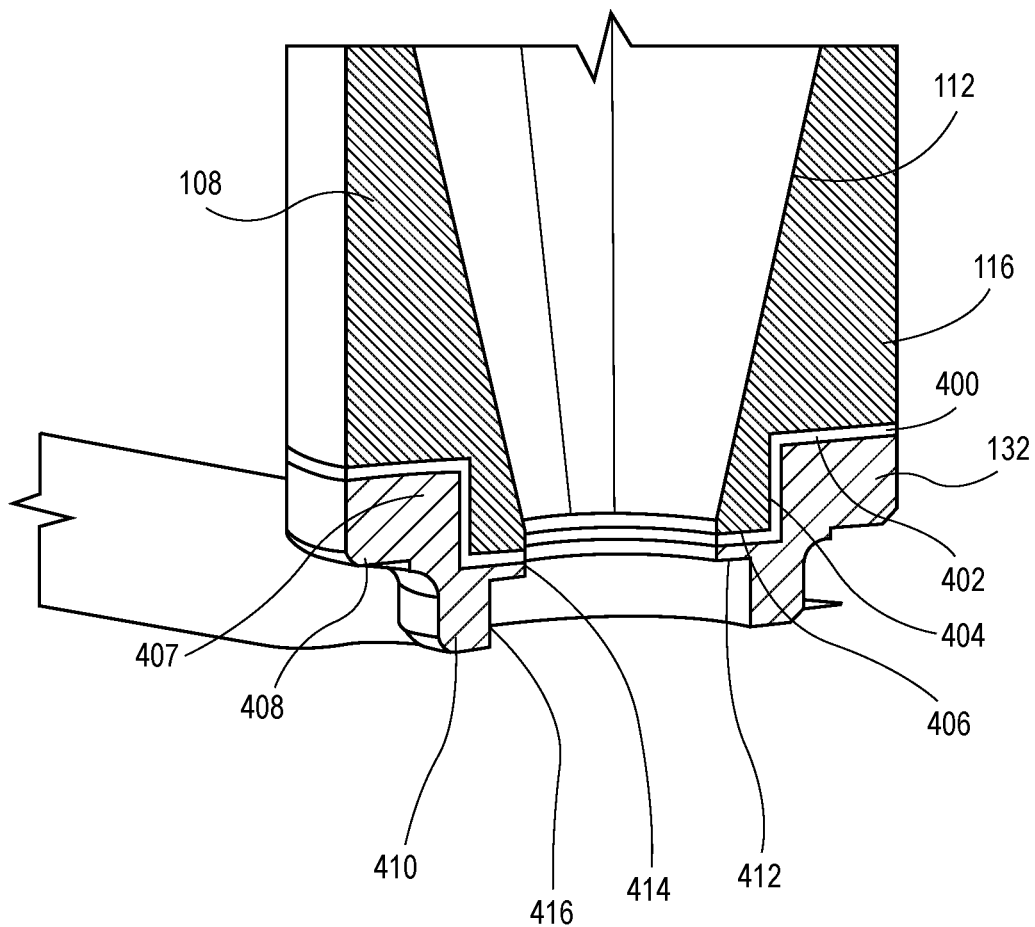
FIG. 4 illustrates a sectional view of a lower portion of the sand separator, according to an embodiment.

FIG. 4 illustrates a perspective, sectional view of the lower portion of the insert 108, showing the second alignment ring 132 received thereon, according to an embodiment. Similar to the first alignment ring 130, the second alignment ring 132 may be secured in place on the insert 108 via a layer of adhesive 400. For example, the base 116 may form an annular shoulder 402 and an axial extension 404 that extends downward from the shoulder 402, until reaching a bottom surface 406 of the insert 108.

The second alignment ring 132 may be shaped complementarily to the shoulder 402 and axial extension 404. For example, the second alignment ring 132 may define an inner shoulder 407 that engages the shoulder 402 and the axial extension 404. The second alignment ring 132 may also define an outer shoulder 408, with an axial extension 410 extending downward therefrom.

A lip 412 of the second alignment ring 132 may be secured to the bottom surface 406 of the insert 108 (e.g., via the layer of adhesive 400). The lip 412 may define a first bore 414 therethrough, and the axial extension 410 may define a second bore 416, which is larger than the first bore 414, extending downward from the lip 412 and communicating with the interior of the insert 108 via the first bore 414. Referring again additionally to FIG. 1, the axial extension 410 of the second alignment ring 132 may extend through the second outlet 124 in the bottom member 106 of the housing 102. The outer shoulder 408 of the second alignment ring 132 may engage the bottom member 106. Accordingly, the axial extension 410 may prevent or limit lateral movement of the base 116 with respect to the housing 102 by engagement with the second outlet 124 in the bottom member 106, while the outer shoulder 408 may engage the bottom member 106 so as to transmit the weight of the insert 108 thereto.

Figure 5:
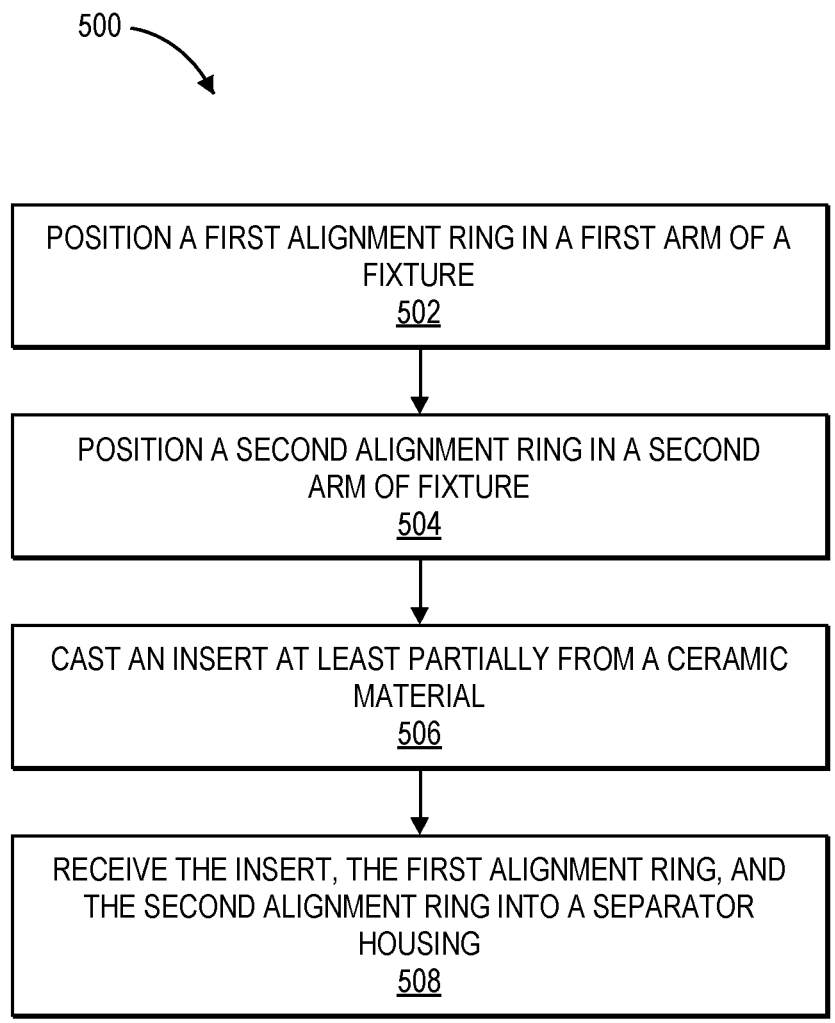
FIG. 5 illustrates a flowchart of a method for manufacturing a separator, according to an embodiment.

FIG. 5 illustrates a flowchart of a method 500 for manufacturing a separator, such as the separator 100, according to an embodiment. It will be appreciated that various aspects of the present method 500 may be combined, separated, executed in parallel, or executed out of order, without departing from the scope of the present disclosure. In some embodiments, the method 500 may be executed at least partially using a fixture 600, as illustrated schematically in FIG. 6, according to an embodiment.

Figure 6:
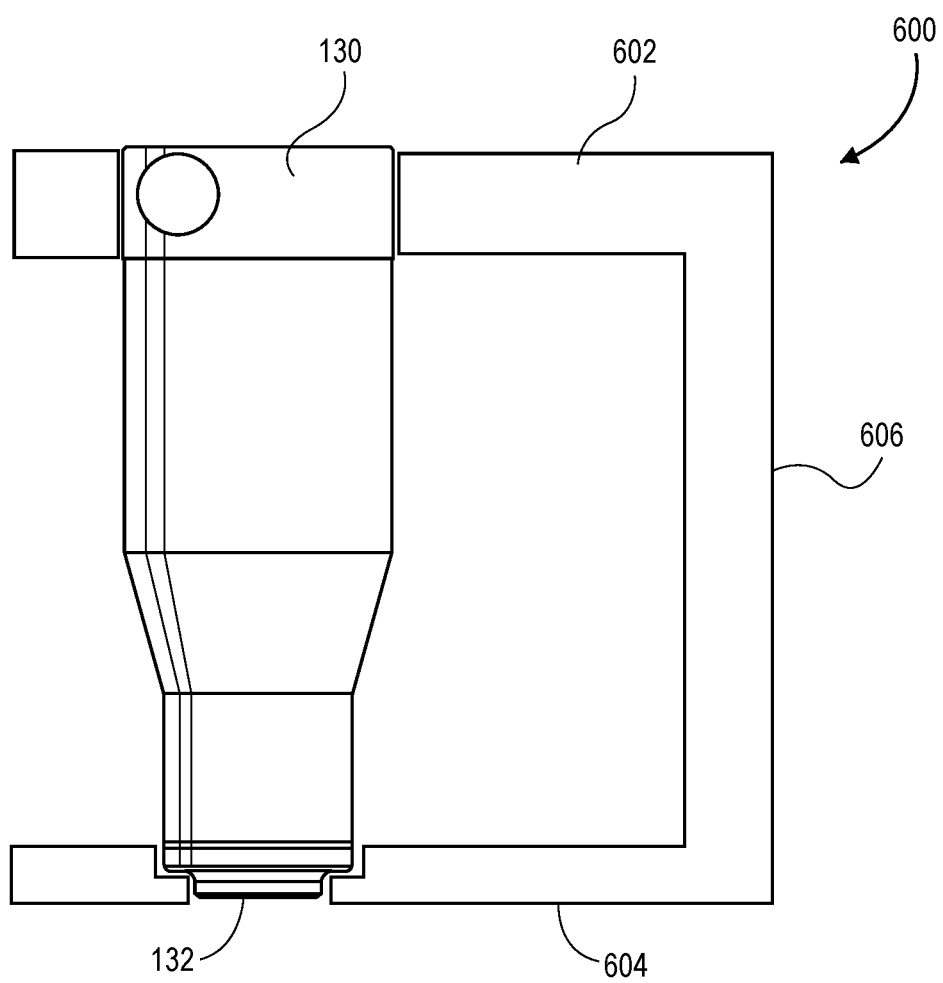
FIG. 6 illustrates a side view of the insert positioned in a fixture for affixing alignment rings to the insert (e.g., by casting the insert within the alignment rings), according to an embodiment.

Referring to both FIGS. 5 and 6, the method 500 may include positioning a first alignment ring 130 in a first arm 602 of the fixture 600, as at 502. The method 500 may further include positioning a second alignment ring 132 in a second arm 604 of the fixture 600, as at 504. The first and second arms 602, 604 may be separated apart from one another via a linkage 606. The linkage 606 may be configured to maintain a precise positioning of the first and second arms 602, 604, and thus the first and second alignment rings 130, 132 received therein, respectively. The fixture 600 may also be configured to be received into and/or form a part of a mold for casting the insert 108. The layers of adhesive 200, 400 (FIGS. 2 and 4) may be applied to the first and second alignment rings 130, 132 prior to introducing the casting material into the mold.

Returning to FIG. 5, the method 500 may include casting the insert 108 at least partially within the first and second alignment rings 130, 132, as at 506. For example, the casting material may be a cement-like slurry of ceramic material, such as silicon carbide, which may be received into the mold, including into the first and second alignment rings 130, 132. The casting material may then be allowed to dry and cure, forming the insert 108 in connection within the first and second alignment rings 130, 132.

The first and second alignment rings 130, 132, which are precisely positioned using the fixture 600, may thus be employed to produce a precise geometry for the ends of the insert 108. Next, the insert 108, including the first and second alignment rings 130, 132, may be received into the housing 102 (FIG. 1) of the separator 100, as at 508. Accordingly, the first and second alignment rings 130, 132, which may slide against and engage the housing 102 may "locate" the insert 108 within the housing 102, thereby avoiding issues that may arise with having a rough-cast ceramic material being received into a tightly-toleranced vessel such as the housing 102. For example, the insert 108 may be slid into the housing 102, with the first alignment ring 130 radially engaging and sliding smoothly against the inner wall 104. Upon locating the first alignment ring 130 at the top of the hollow region 105, e.g., against the flange 125, the bottom member 106 may be secured to the remainder of the housing 102, such that the second alignment ring 132 extends at least partially therethrough, as discussed above.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A sand separator, comprising:
   an insert defining a vortical flow chamber therein, wherein the insert comprises a cylindrical portion and a conical portion, and wherein the insert is made at least partially from a ceramic material;
   an inlet extending through the insert in the cylindrical portion and configured to introduce a sand-laden fluid into the vortical flow chamber;
   a first alignment ring fixed to the insert and located proximal to a top of the insert, and wherein the inlet extends through the first alignment ring;
   a first outlet extending through vertically upward from the cylindrical portion and configured to receive a fluid portion of the sand-laden fluid from the vortical flow chamber; and
   a second outlet extending vertically downward from the conical portion and configured to receive a sand portion of the sand-laden fluid from the vortical flow chamber.

2. The sand separator of claim 1, wherein the ceramic material is silicon carbide.

3. The sand separator of claim 1, further comprising a housing having an inner wall defining a hollow region in which the insert is positioned, wherein the first alignment ring engages the inner wall to locate the insert radially within the housing.

4. The sand separator of claim 3, wherein the ceramic material is spaced radially apart from the inner wall of the housing.

5. The sand separator of claim 1, further comprising a second alignment ring fixed to the insert and located proximal to a bottom of the insert, wherein the second outlet extends axially through the second alignment ring.

6. The sand separator of claim 5, wherein the conical portion comprises a base, the base providing the bottom of the conical portion, and wherein the second alignment ring is secured to the base.

7. The sand separator of claim 6, further comprising a housing in which the insert is positioned, wherein the second alignment ring comprises an inner shoulder secured to a lower shoulder of the base, and wherein the second alignment ring comprises an outer shoulder, the outer shoulder being received into an engaging an outlet of the housing, so as to locate the insert in the housing.

8. The sand separator of claim 5, wherein the second alignment ring comprises a lip secured to a bottom surface of the bottom of the insert, and an axial extension, wherein the lip defines a first bore and the axial extension defines a second bore that is larger than the first bore and communicates with the vortical flow chamber via the first bore.

9. A method for constructing a sand separator, the method comprising:
positioning a first alignment ring in a first arm of a fixture;
positioning a second alignment ring in a second arm of the fixture, wherein the fixture holds the first and second alignment rings in position relative to one another;
casting an insert from a ceramic material at least partially within the first and second alignment rings; and
receiving the insert, the first alignment ring, and the second alignment ring in a housing having an inlet, a first outlet, and a second outlet, wherein the inlet, the first outlet, and the second outlet each communicate with a vortical flow chamber defined within the insert.

10. The method of claim 9, wherein the ceramic material comprises a silicon carbide.

11. The method of claim 9, wherein securing the first and second alignment rings comprises adhering the first and second alignment rings to the insert.

12. The method of claim 9, wherein the first and second alignment rings engage the housing, so as to locate the insert within the housing.

13. The method of claim 12, wherein the insert is spaced apart from the housing by the first and second alignment rings.

14. The method of claim 9, wherein receiving the insert, the first alignment ring, and the second alignment ring in the housing comprises sliding the first alignment ring into position at a top of a hollow region of the housing.

15. The method of claim 9, further comprising receiving a bottom member of the housing onto a remainder of the housing, wherein the bottom member at least partially defines the second outlet, and wherein the second alignment ring at least partially extends into the second outlet.

16. A sand separator, comprising:
an insert defining a vortical flow chamber therein, wherein the insert comprises a cylindrical portion and a conical portion, and wherein the insert is made at least partially from a ceramic material;
an inlet extending through the insert in the cylindrical portion and configured to introduce a mixed fluid into the vortical flow chamber;
a first outlet extending through vertically upward from the cylindrical portion and configured to receive a first portion of the mixed fluid from the vortical flow chamber, the first portion having a reduced sand content as compared to the mixed fluid;
a second outlet extending vertically downward from the conical portion and configured to receive a second portion of the mixed fluid from the vortical flow chamber, the second portion having an increased sand content as compared to the mixed fluid;
a first alignment ring fixed to the insert and located proximal to a top of the insert, and wherein the inlet extends through the first alignment ring; and
a second alignment ring fixed to the insert and located proximal to a bottom of the insert, wherein the second outlet extends axially through the second alignment ring.

17. The sand separator of claim 16, wherein the conical portion comprises a base, the base providing the bottom of the conical portion, wherein the second alignment ring is secured to the base, and wherein the sand separator further comprises a housing in which the insert is positioned, wherein the second alignment ring comprises an inner shoulder secured to a lower shoulder of the base, and wherein the second alignment ring comprises an outer shoulder, the outer shoulder being received into an engaging an outlet of the housing, so as to locate the insert in the housing.

18. The sand separator of claim 17, wherein the insert is spaced apart from the housing by the first and second alignment rings.

19. The sand separator of claim 16, wherein the ceramic material comprises silicon carbide.

20. A sand separator, comprising:
an insert defining a vortical flow chamber therein, wherein the insert comprises a cylindrical portion and a conical portion, and wherein the insert is made at least partially from a ceramic material;
an inlet extending through the insert in the cylindrical portion and configured to introduce a sand-laden fluid into the vortical flow chamber;
a first outlet extending through vertically upward from the cylindrical portion and configured to receive a fluid portion of the sand-laden fluid from the vortical flow chamber;
a second outlet extending vertically downward from the conical portion and configured to receive a sand portion of the sand-laden fluid from the vortical flow chamber; and
an alignment ring fixed to the insert and located proximal to a bottom of the insert, wherein the second outlet extends axially through the alignment ring.

* * * * *